(12) United States Patent
Fremrot et al.

(10) Patent No.: US 6,445,205 B1
(45) Date of Patent: Sep. 3, 2002

(54) METHOD OF TESTING INTEGRATED CIRCUITS

(75) Inventors: Per Fremrot, Mtn. View; Mats Frännhagen, Greenbrae, both of CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/444,951

(22) Filed: Nov. 22, 1999

(30) Foreign Application Priority Data

Nov. 26, 1998 (GB) ............................................. 9825959

(51) Int. Cl.⁷ ......................... G01R 31/26; G01R 31/02
(52) U.S. Cl. ........................................ 324/765; 324/760
(58) Field of Search ................................ 324/765, 760, 324/73.1

(56) References Cited

U.S. PATENT DOCUMENTS

| | | | |
|---|---|---|---|
| 3,761,695 A | | 9/1973 | Eichelberger ......... 235/153 AC |
| 4,467,420 A | | 8/1984 | Murakami et al. .......... 364/200 |
| 4,498,172 A | | 2/1985 | Bhavsar ....................... 371/25 |
| 4,683,569 A | | 7/1987 | Rubin .......................... 371/25 |
| 4,791,358 A | * | 12/1988 | Sauerwald et al. ........ 324/73.1 |
| 4,878,168 A | | 10/1989 | Johnson et al. ............. 364/200 |
| 4,879,717 A | | 11/1989 | Sauerwald et al. ........ 371/22.3 |
| 4,885,538 A | * | 12/1989 | Hoenniger III et al. ..... 324/312 |
| 4,897,818 A | * | 1/1990 | Redwine et al. ............ 365/221 |

(List continued on next page.)

FOREIGN PATENT DOCUMENTS

| | | |
|---|---|---|
| JP | 60189545 | 9/1985 |
| JP | 62055955 | 3/1987 |
| JP | 63133234 | 6/1988 |
| JP | 63286780 | 11/1988 |
| JP | 1221686 | 9/1989 |
| JP | 4033134 | 2/1992 |
| JP | 4050784 | 2/1992 |
| JP | 4070933 | 3/1992 |
| JP | 4289473 | 10/1992 |
| JP | 4294430 | 10/1992 |
| JP | 5249183 | 9/1993 |
| JP | 6201782 | 7/1994 |
| JP | 7151828 | 6/1995 |
| JP | 7271628 | 10/1995 |
| JP | 8005703 | 1/1996 |
| WO | 92/11643 | 7/1992 |

OTHER PUBLICATIONS

Betts. J., Patents Act 1977: Search Report Under Section 17 (5); Appl. No. GB9825959.1; Mar. 31, 1999, pp. 1–2.
Renault, S., International Search Report, App. No. PCT/EP99/08992, Apr. 14, 2000, pp. 1–5.

Primary Examiner—Michael Sherry
Assistant Examiner—Jermele Hollington
(74) Attorney, Agent, or Firm—Jenkens & Gilchrist, P.C.

(57) ABSTRACT

An integrated circuit which allows for ease of testing thereof, and a method of such testing. The integrated circuit includes a linear shift register without feedback, which converts signals on a bus into a serial bitstream. The integrated circuit has an output pin connected to the linear shift register to receive the serial bitstream thereon. The method of testing the chip includes supplying test inputs to the chip, reading the serial bitstream data during the test from an output pin of the integrated circuit, and comparing the output data in a test device with an expected bitstream. The signals on the bus under investigation can be monitored continually throughout the test. In the event that a fault is discovered, the test can be terminated much more quickly than when using a device which requires the test to be completed before any data can be read out.

18 Claims, 2 Drawing Sheets

U.S. PATENT DOCUMENTS

| | | | |
|---|---|---|---|
| 4,967,142 A | 10/1990 | Sauerwald et al. | 324/73.1 |
| 5,153,882 A | 10/1992 | Lyon et al. | 371/22.3 |
| 5,253,255 A | 10/1993 | Carbine | 371/22.6 |
| 5,301,199 A | 4/1994 | Ikenaga et al. | 371/22.5 |
| 5,331,571 A * | 7/1994 | Aronoff et al. | 324/73.1 |
| 5,355,369 A * | 10/1994 | Greenbergerl et al. | 714/727 |
| 5,428,625 A | 6/1995 | Dekker | 371/22.3 |
| 5,428,770 A | 6/1995 | Garner | 395/575 |
| 5,515,382 A | 5/1996 | Lassorie | 371/22.3 |
| 5,809,036 A * | 9/1998 | Champlin | 324/73.1 |
| 5,892,961 A * | 4/1999 | Trimberger | 326/39 |
| 6,035,380 A * | 3/2000 | Shelton et al. | 395/500.47 |
| 6,101,457 A * | 8/2000 | Barch et al. | 324/73.1 |

\* cited by examiner

METHOD OF TESTING INTEGRATED CIRCUITS

TECHNICAL FIELD OF THE INVENTION

This invention relates to a method of testing an integrated circuit, in particular an integrated circuit having an internal bus which is not observable on the pins of the circuit. An example of this is a chip with a Harvard architecture.

BACKGROUND OF THE INVENTION

In the manufacture of ASICs (Application-Specific Integrated Circuits), it is particularly advantageous to be able to test the circuits before they are mounted in a product, because of the extra costs which arise if a circuit is found at that late stage to be faulty.

A particular problem in testing ASICs is that it is often desirable to monitor signals on an internal bus as part of the test. However, there may be no way of monitoring signals which are carried on this bus. This is of particular concern when the system has an internal processor, and it is desired to monitor signals passed between the processor and memories or other circuit blocks. For example, in the case of a Harvard architecture chip, in which the central processor has an address bus and a data bus for the program, and an address bus and a data bus for data, the program buses are typically connected to an external memory, and used for reading instructions to the processor. Since this bus goes to an external device, it is possible to monitor signals which are passed on the bus. However, the data buses typically stay on-chip, which means that there will be no way to monitor the activity on these buses, unless special measures are taken.

JP-63-133234 discloses a microcomputer, having a data bus and an address bus, provided with an on-chip device for carrying out a test.

In particular, this device includes a CRC arithmetic register, which may typically be in the form of a linear feedback shift register, which is set into an initial operational state, before the test is carried out. During the test, data on the bus which is studied are used to calculate a checksum, which after the test, can be read out.

The use of a CRC-register in the form of a shift resister with feedback can cause problems in the event that an "undefined" signal enters the shift register. The feedback means that, eventually, undefined bits can fill the register.

Moreover, the process of storing the data during the complete test, and subsequently reading the data, means that no error can be detected until the test is complete.

SUMMARY OF THE INVENTION

In accordance with a first aspect of the invention, an integrated circuit includes a linear shift register without feedback, which converts signals on a bus into a serial bitstream. The integrated circuit has an output pin connected to the linear shift register to receive the serial bitstream thereon.

This has the advantage that the signals on the bus under investigation can be monitored continually throughout the test. In the event that a fault is discovered, the test can be terminated much more quickly than when using a device which requires the test to be completed before any data can be read out.

Moreover, the absence of feedback means that the presence of an undefined bit in the register will persist only for a limited number of clock cycles.

In accordance with a second aspect of the invention, there is disclosed a method of testing an integrated circuit, in which signals on a bus are converted into a bitstream, and read during the test from an output pin of the integrated circuit, and are then compared in a test device with an expected bitstream.

Again, this has the advantage that, as soon as a device is determined to be faulty, the test can be terminated without wasting further time.

DETAILED DESCRIPTION OF PREFERRED EMBODIMENTS

Figure 1:
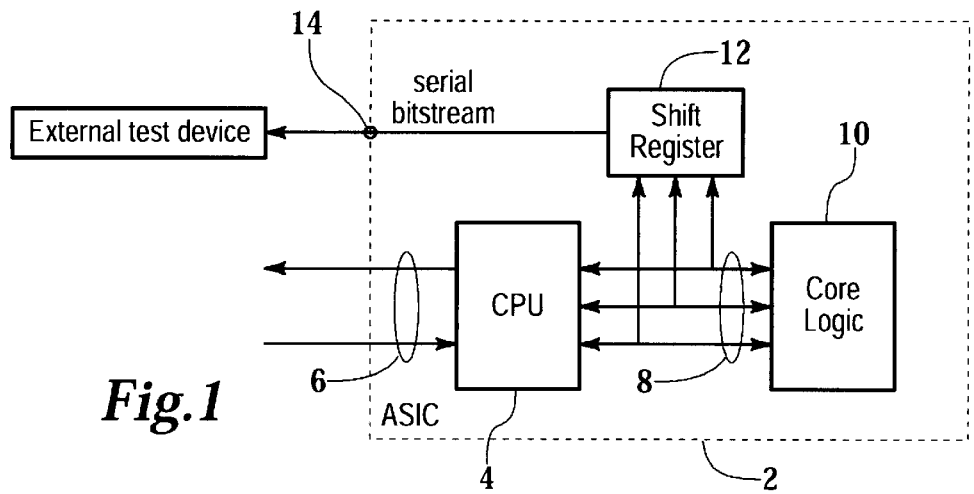
FIG. 1 is a block schematic diagram of the relevant parts of an integrated circuit in accordance with the invention.

FIG. 1 is a block schematic representation of an ASIC 2, having an embedded processor. It will be appreciated that the circuit may have a relatively complex design; however, for ease of explanation, only the relevant parts of the circuit are shown in FIG. 1. In particular, FIG. 1 shows the important elements of a Harvard architecture circuit, having a processor, or CPU, 4, which has two pairs of address and data buses, namely a pair of program buses and a pair of data buses. Each pair of buses includes an address bus and a data bus.

In this case, the program bus 6 is connected to input/output pins of the integrated-circuit 2, for connection to an external memory device (not shown), for reading instructions to the processor 4.

The data bus 8 is connected to other core logic functions 10 of the circuit, such as memories or other circuit blocks.

However, the bus is "embedded", that is, not connected to external pins of the integrated circuit. In the absence of special measures, signals on the data bus 8 cannot be monitored, and this is an important aspect of any testing procedure.

In accordance with the preferred embodiment of the invention, therefore, the data bus 8 is provided with a series of connections to a shift register 12. As will be described in more detail below, with reference to FIG. 2, each line of the data bus 8 is provided with a separate connection to a respective flip-flop of the shift register. As is well known, the shift register can convert the parallel data, in which bits on each line of the bus 8 are presented simultaneously, to serial data in the form of a bitstream. The output data are supplied to an output pin 14 of the integrated circuit 2, where they can be monitored by an external test device.

Figure 2:
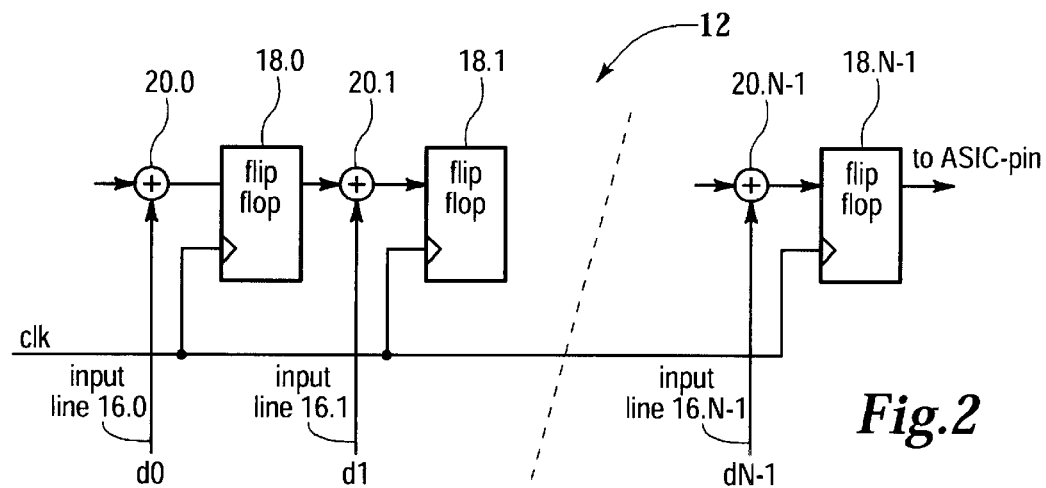
FIG. 2 is a block diagram of a shift register forming part of the integrated circuit of FIG. 1.

FIG. 2 shows in more detail the structure of the shift register 12. The shift register 12 has a plurality (N) of input lines 16.0, 16.1, . . . , 16.N-1, each connected to a respective line of the data bus 8, and receiving at any time a respective data bit d0, d1, . . . , dN-1 thereon. Each input line 16.0, 16.1, . . . , 16.N-1 is associated with a respective flip-flop 18.0, 18.1, . . . , 18.N-1. Each input data line 16.0, 16.1, . . . , 16.N-1 is connected to one input of a respective single bit adder, which may be in the form of a XOR gate, 20.0, 20.1, ..., 20.N-1. The second input of the first adder 20.0 receives an arbitrary known bit, and the second inputs of the other adders 20.1, ..., 20.N-1 come from the outputs of the respectively immediately preceding flip-flops 18.0, ..., 18.N-2. Each flip-flop 18.0, 18.1, ... 18.N-1 receives the output of the respective adder 20.0, 20.1, ..., 20.N-1 as its input.

The output from the final flip-flop 18.N-1 is connected to the output pin 14 of the ASIC. The clock inputs of the flip-flops are clocked simultaneously at the data rate on the data bus 8.

In operation of the circuit 2 in a test process, a known test pattern of data is supplied to the device, and the signals appearing on the data bus 8 are monitored via the bitstream appearing at the output pin 14. This bitstream is then compared with a reference bitstream, which is what is expected to be obtained from a correctly functioning device.

Moreover, the test will still work if some bits on the data bus are unknown.

Figure 3:
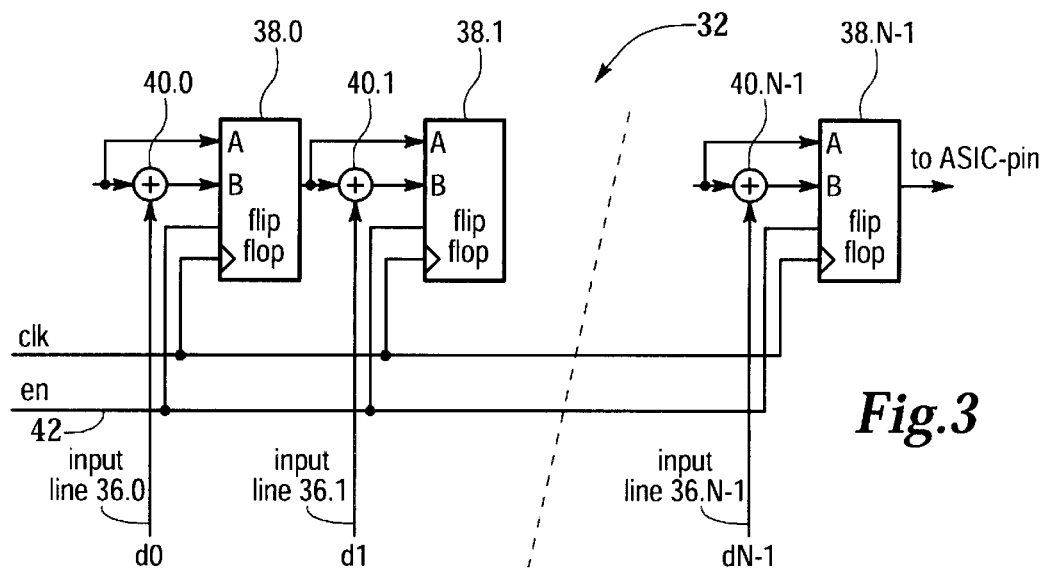
FIG. 3 shows an alternative form of the shift register shown in the integrated circuit of FIG. 1.

FIG. 3 shows an alternative form of the shift register, in which new data is added only when the input is valid on the bus. This is achieved by multiplexing the flip-flops, or using mulitplexers in front of the flip-flops.

The shift register 32 has a plurality (N) of input lines 36.0, 36.1, ..., 36.N-1, each connected to a respective line of the data bus 8, and receiving at any time a respective data bit d0, d1, ..., dN-1 thereon. Each input line 36.0, 36.1, ..., 36.N-1 is associated with a respective flip-flop 38.0, 38.1, ..., 38.N-1. Each input data line 36.0, 36.1, ..., 36.N-1 is connected to one input of a respective single bit adder, which may be in the form of a XOR gate, 40.0, 40.1, ..., 40.N-1. The second input of the first adder 40.0 receives an arbitrary known bit, and the, second inputs of the other adders 40.1, ..., 40.N-1 come from the outputs of the respectively immediately preceding flip-flops 38.0, ..., 38.N-2. The first flip-flop 38.0 receives the same arbitrary bit as its A input.

Each subsequent flip-flop 38.1, ..., 38.N-1 receives the output of the respectively immediately preceding flip-flop as its A input. Each flip-flop 38.0, 38.1, ..., 38.N-1 receives the output of the respective adder 40.0, 40.1, ..., 40.N-1 as its B input.

The output from the final flip-flop 18.N-1 is connected to the output pin 14 of the ASIC. The clock inputs of the flip-flops are clocked simultaneously at the data rate on the data bus 8. An enable signal on line 42 is used to select whether or not information on the bus should be added into the shift register.

Figure 4:
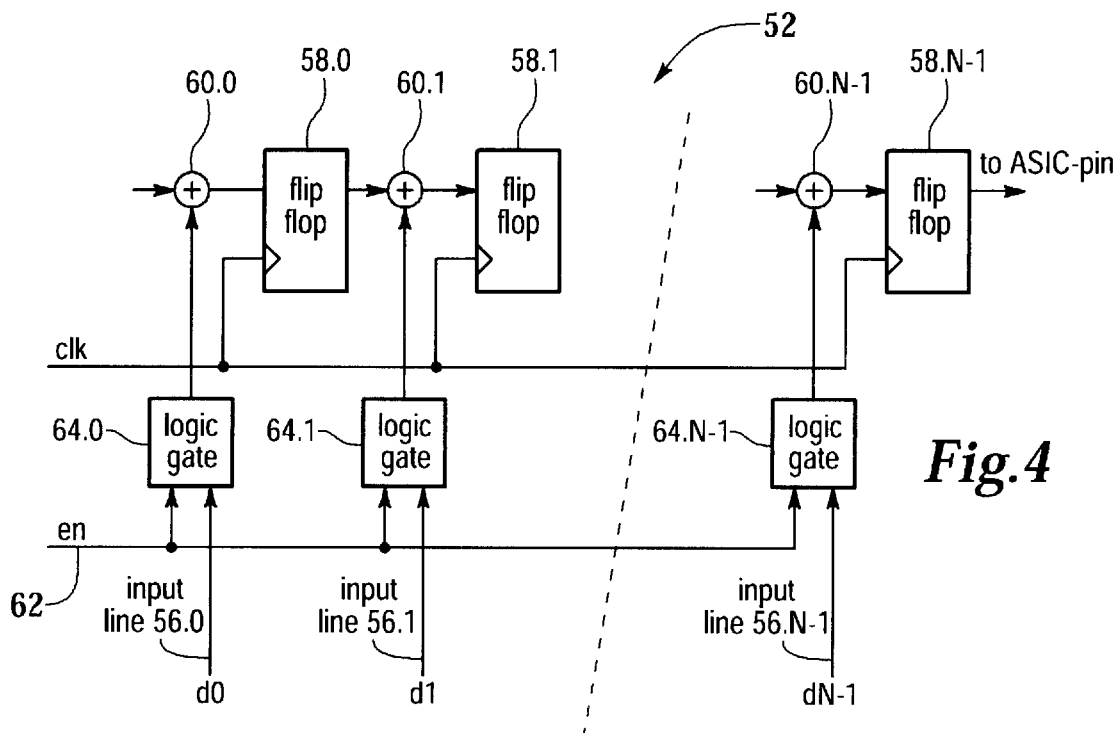
FIG. 4 shows a further alternative form of the shift register forming part of the integrated circuit shown in FIG. 1.
Figure 5:
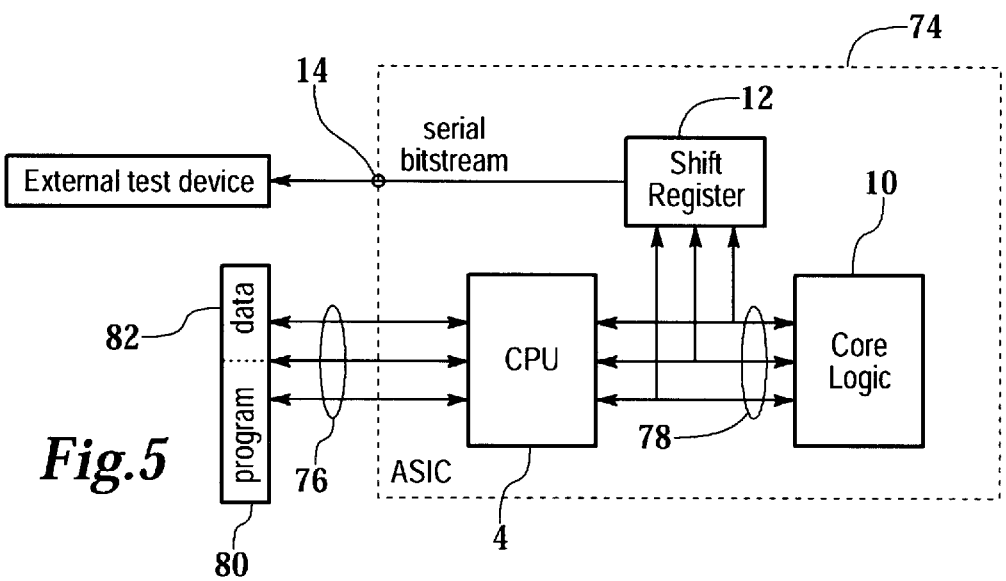
FIG. 5 is a block schematic diagram of the relevant parts of an integrated circuit in accordance with the invention.

FIG. 4 shows a further alternative form of the shift register 12, in which new data is added only when the input is valid on the bus, and this is achieved by gating the input with a logic gate.

The shift register 52 has a plurality (N) of input lines 56.0, 56.1, ..., 56.N-1, each connected to a respective line of the data bus 8, and receiving at any time a respective data bit d0, d1, ..., dN-1 thereon. Each input line 56.0, 56.1, ..., 56.N-1 is associated with a respective flip-flop 58.0, 58.1, ..., 58.N-1. Each input data line 56.0, 56.1, ..., 56.N-1 is connected to a first input of a respective logic gate 64.0, 64.1, ..., 64.N-1, the outputs of which are respectively connected to one input of a respective single bit adder, which may be in the form of a XOR gate, 60.0, 60.1, ..., 60.N-1. The second input of the first adder 60.0 receives an arbitrary bit, and the second inputs of the other adders 60.1, ..., 60.N-1 come from the outputs of the respectively immediately preceding flip-flops 58.0, ..., 58.N-2.

The output from the final flip-flop 18.N-1 is connected to the output pin 14 of the ASIC. The clock inputs of the flip-flops are clocked simultaneously at the data rate on the data bus 8. The second inputs of the logic gates 64.0, 64.1, ..., 64.N-1 receive an enable signal on a line 62, which determines whether data bits are added into the shift register. The logic gates may be AND gates, which are activated by a high signal on line 62, or OR gates, which are controlled by a low signal on line 62.

Thus, the embodiments of FIGS. 3 and 4 ensure that data, from the data bus, are only added to the shift registers when they are expected to be of interest. Although the invention has been described above with reference to a Harvard architecture device, it should be noted that a von Neumann architecture processor 74, in which a common bus 76 is used for both program 80 and data 82, having internal buses 78 which are not observable on the circuit pins, can also be tested in the same way, by providing the same on-chip shift register 12.

It will therefore be appreciated that, in the preferred embodiment, the use of a linear shift register, without feedback, means that the output test data can be examined immediately, with the result that, if any error is detected, the test can be regarded as terminated, which means that faulty chips can be detected more efficiently.

What is claimed is:

1. A method of testing an integrated circuit comprising:
   an internal bus, having a plurality of lines;
   a linear shift register, having its inputs connected to respective lines of the bus, and adapted to convert signals on the lines of the bus into a serial bitstream; and
   an output pin, connected to the linear shift register and adapted to receive the serial bitstream thereon, and the method comprising:
   supplying test inputs to the integrated circuit;
   on the integrated circuit, converting signals on the internal bus thereof into the serial bitstream;
   reading the serial bitstream from the output pin of the integrated circuit; and
   in a test device, comparing the read bitstream with a known bitstream.

2. A method as claimed in claim 1, wherein the integrated circuit has a Harvard architecture, having a processor and having a program bus and a data bus connected to the processor, and wherein the internal bus is said data bus.

3. A method as claimed in claim 1, wherein the integrated circuit has a von Neumann architecture, having at least one internal bus which is not observable on pins of the circuit.

4. A method as claimed in claim 1, wherein the linear shift register comprises a plurality of registers, each register receiving an input from a respective adder, and each adder being connected to a respective line of the bus, the registers being clocked at the data rate of the bus.

5. A method as claimed in claim 4, wherein data are added to the shift register only when each register also receives an enable signal at an input thereof.

6. A method as claimed in claim 4, wherein data are added to the shift register through logic gates, only when each logic gate also receives an enable signal at an input thereof.

7. A method of testing an integrated circuit, the method comprising the steps of:
   supplying test inputs to the integrated circuit;
   converting, via a linear shift register on the integrated circuit, signals on an internal bus of the integrated circuit into a serial bitstream;

reading the serial bitstream from a single output pin of the integrated circuit; and in a test device, comparing the read serial bitstream to a known bitstream.

8. A method as claimed in claim 7, further comprising a processor, and a program bus and a data bus connected to the processor, and wherein the internal bus is the data bus and the circuit employs a Harvard architecture.

9. A method as claimed in claim 7, wherein the integrated circuit implements a von Neumann architecture and has at least one internal bus that is not observable on pins of the circuit.

10. A method as claimed in claim 7, wherein the linear shift register comprises a plurality of registers, each register receiving an input from a respective adder, and each adder being connected to a respective line of the bus, the registers being clocked at the data rate of the bus.

11. A method as claimed in claim 10, wherein data are added to the shift register only when each register receives an enable signal at an input thereof.

12. A method as claimed in claim 10, wherein data are added to the shift register, through logic gates, only when each logic gate receives an enable signal at an input thereof.

13. A integrated circuit comprising:

an internal bus having a plurality of lines;

a linear shift register having inputs connected to respective lines of the bus and being adapted to convert signals on the lines of the bus into a serial bitstream; and an output pin connected to the linear shift register, the output pin being adapted to receive the serial bitstream thereon, wherein test inputs are applied to the integrated circuit, signals on the internal bus of the integrated circuit are converted into a serial bitstream, the serial bitstream is read from the output pin, and the read serial bitstream is used to determine if the integrated circuit is functioning correctly.

14. A circuit as claimed in claim 13, further comprising a processor, a program bus and a data bus connected to the processor, wherein the internal bus is the data bus and the circuit employs a Harvard architecture.

15. A circuit as claimed in claim 13, further comprising a von Neumann architecture and at least one internal bus that is not observable on pins of the circuit.

16. A circuit as claimed in claim 13, wherein the linear shift register comprises a plurality of register, each register is adapted to receive an input from a respective adder and is clocked at a data rate of the bus, and each adder is connected to a respective line of the bus.

17. A circuit as claimed in claim 16, wherein data are added to the linear shift register only when each register receives an enable signal at an input thereof.

18. A circuit as claimed in claim 16, wherein data are added to the linear shift register, through logic gates, only when each logic gate receives an enable signal at an input thereof.

* * * * *

UNITED STATES PATENT AND TRADEMARK OFFICE
CERTIFICATE OF CORRECTION

PATENT NO.     : 6,445,205 B1
DATED          : September 3, 2002
INVENTOR(S)    : Per Fremrot et al.

It is certified that error appears in the above-identified patent and that said Letters Patent is hereby corrected as shown below:

Title page,
Item [57], ABSTRACT,
Replace "An integrated circuit which allows for ease of testing thereof, and a method of such testing. The integrated circuit includes a linear shift register without feedback, which converts signals on a bus into a serial bitstream. The integrated circuit has an output pin connected to the linear shift register to receive the serial bitstream thereon. The method of testing the chip includes supplying test inputs to the chip, reading the serial bitstream data during the test from an output pin of the integrated circuit, and comparing the output data in a test device with an expected bitstream. The signals on the bus under investigation can be monitored continually throughout the test. In the event that a fault is discovered, the test can be terminated much more quickly than when using a device which requires the test to be completed before any data can be read out." with
--     There is disclosed an integrated circuit which allows for ease of testing thereof, and a method of such testing. The integrated circuit includes a linear shift register without feedback, which converts signals on a bus into a serial bitstream. The integrated circuit has an output pin connected to the linear shift register to receive the serial bitstream thereon. The method of testing the chip includes supplying test inputs to the chip, reading the serial bitstream data during the test from an output pin of the integrated circuit, and comparing the output data in a test device with an expected bitstream. This has the advantage that the signals on the bus under investigation can be monitored continually throughout the test. In the event that a fault is discovered, the test can be terminated much more quickly than when using a device which requires the test to be completed before any data can be read out. --

UNITED STATES PATENT AND TRADEMARK OFFICE
CERTIFICATE OF CORRECTION

PATENT NO.    : 6,445,205 B1
DATED         : September 3, 2002
INVENTOR(S)   : Per Fremrot et al.

It is certified that error appears in the above-identified patent and that said Letters Patent is hereby corrected as shown below:

<u>Column 1,</u>
Line 43, replace "a shift resister" with -- a shift register --

<u>Column 6,</u>
Line 17, replace "plurality of register," with -- plurality of registers, --

Signed and Sealed this

Fifteenth Day of April, 2003

JAMES E. ROGAN
*Director of the United States Patent and Trademark Office*